United States Patent
Yang et al.

(10) Patent No.: US 11,696,271 B2
(45) Date of Patent: Jul. 4, 2023

(54) METHOD AND APPARATUS FOR TRANSMITTING AND RECEIVING RADIO SIGNALS IN A WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR); Jaehyung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/989,308

(22) Filed: Nov. 17, 2022

(65) Prior Publication Data
US 2023/0090006 A1   Mar. 23, 2023

Related U.S. Application Data

(63) Continuation of application No. 17/512,220, filed on Oct. 27, 2021, which is a continuation of application
(Continued)

(30) Foreign Application Priority Data

Apr. 5, 2018 (KR) .................. 10-2018-0039476

(51) Int. Cl.
*H04W 72/04* (2023.01)
*H04W 72/0453* (2023.01)
*H04L 1/16* (2023.01)

(52) U.S. Cl.
CPC ........... *H04W 72/0453* (2013.01); *H04L 1/16* (2013.01)

(58) Field of Classification Search
CPC ... H04L 1/1887; H04L 5/0053; H04L 5/0048; H04L 5/0091; H04L 5/14; H04L 5/001;
(Continued)

(56) References Cited

U.S. PATENT DOCUMENTS

2012/0257554 A1  10/2012  Kim et al.
2014/0064205 A1   3/2014  Feng et al.
(Continued)

FOREIGN PATENT DOCUMENTS

CN   102594763   7/2012
CN   103493559   1/2014
(Continued)

OTHER PUBLICATIONS

Office Action in Japanese Appln. No. 2019-569778, dated Jun. 21, 2022, 7 pages (with English translation).
(Continued)

*Primary Examiner* — Jung Liu
(74) *Attorney, Agent, or Firm* — Fish & Richardson P.C.

(57) ABSTRACT

The present invention relates to a wireless communication system, and more particularly, to a method of transmitting and receiving a radio signal and an apparatus therefor. The method comprises the steps of receiving data in a time unit #n of a first frequency band and transmitting A/N in a time unit #m+k of a second frequency band in response to the data. In this case, the first frequency band and the second frequency band have different subcarrier spacing and a time unit #m of the second frequency band indicates the last time unit among a plurality of time units of the second frequency band corresponding to the time unit #n of the first frequency band.

20 Claims, 16 Drawing Sheets

Related U.S. Application Data

No. 16/065,698, filed as application No. PCT/KR2018/006855 on Jun. 18, 2018, now Pat. No. 11,219,023.

(60) Provisional application No. 62/630,324, filed on Feb. 14, 2018, provisional application No. 62/548,912, filed on Aug. 22, 2017, provisional application No. 62/520,560, filed on Jun. 16, 2017.

(58) Field of Classification Search
CPC . H04L 5/0055; H04L 1/1812; H04L 27/2602; H04L 27/2646; H04L 5/0094; H04L 5/0007; H04W 72/0446; H04W 72/12; H04W 72/042; H04W 88/08; H04W 88/02; H04W 74/0841; H04W 74/004
See application file for complete search history.

(56) References Cited

U.S. PATENT DOCUMENTS

| | | |
|---|---|---|
| 2015/0249962 A1 | 9/2015 | Suzuki et al. |
| 2015/0312934 A1 | 10/2015 | Chen et al. |
| 2016/0353475 A1 | 12/2016 | Au et al. |
| 2018/0084432 A1 | 3/2018 | Kwak et al. |
| 2018/0198570 A1 | 7/2018 | Astely et al. |
| 2019/0014576 A1 | 1/2019 | Liao et al. |
| 2019/0081832 A1 | 3/2019 | Marinier et al. |
| 2019/0116489 A1 | 4/2019 | Harada |
| 2019/0149380 A1 | 5/2019 | Babaei et al. |
| 2019/0313309 A1 | 10/2019 | Tsuboi et al. |
| 2020/0022175 A1 | 1/2020 | Xiong et al. |
| 2020/0344761 A1 | 10/2020 | Amuru et al. |

FOREIGN PATENT DOCUMENTS

| | | |
|---|---|---|
| CN | 106559187 | 4/2017 |
| CN | 106664655 | 5/2017 |
| CN | 106165333 | 5/2019 |
| CN | 106170998 | 6/2019 |
| CN | 106171028 | 12/2019 |
| EP | 3579612 | 12/2019 |
| JP | 2017-092615 | 5/2017 |
| KR | 1020070030832 | 10/2007 |
| KR | 1020150143116 | 12/2015 |
| WO | WO2011034350 | 3/2011 |
| WO | WO 2017/003265 | 1/2017 |
| WO | WO2017026086 | 2/2017 |
| WO | WO 2018/056338 | 3/2018 |

OTHER PUBLICATIONS

CN Office Action in Chinese Appln. No. 201880003903.1, dated Feb. 19, 2021, 22 pages (with English translation).
EP Extended European Search Report in European Appln. No. 18817772.9, dated Feb. 8, 2021, 11 pages.
Huawei et al., "On NR carrier aggregation," 3GPP Tsg Ran WG1 Meeting #89, dated May 15-19, 2017, 6 pages.
Intel Corporation, "HARQ aspects for carrier aggregation," 3GPP TSG RAN WG1 Meeting #89, dated May 15-19, 2017, 6 pages.
Korean Notice of Allowance in Korean Application No. 10-2018-0069689, dated Sep. 9, 2019, 3 pages (with English translation).
LG Electronics, "Discussion on scheduling and HARQ for NR CA," 3GPP TSG RAN WG1 Meeting #89, dated May 15-19, 2017, 6 pages.
Qualcomm Incorporated, "Handling collisions between n+4 and n+3 for shortened processing time for 1ms TTI," R1-1702552, 3GPP TSG RAN WG1 #88, Athens, Greece, Feb. 13-17, 2017, 2 pages.
Qualcomm Incorporated, "Summary of [86-19] Discussion on Slot Structure Use Cases," R1-1610128, Presented at 3GPP TSG-RAN WG1 #86bis, Oct. 10-14, 2016, Lisbon, Portugal, 20 pages.
Vivo, "NR transmission on anchor bandwidth part," 3GPP TSG RAN WG1 Meeting #89, dated May 15-19, 2017, 4 pages.
Office Action in Japanese Appln. No. 2019-569778, dated Nov. 29, 2022, 9 pages (with English translation).

Option 1

Option 2

METHOD AND APPARATUS FOR TRANSMITTING AND RECEIVING RADIO SIGNALS IN A WIRELESS COMMUNICATION SYSTEM

CROSS-REFERENCE TO RELATED APPLICATIONS

This application is a continuation of U.S. application Ser. No. 17/512,220, filed on Oct. 27, 2021, which is a continuation of U.S. application Ser. No. 16/065,698, filed on Jan. 10, 2019, which is a National Stage application under 35 U.S.C. § 371 of International Application No. PCT/KR2018/006855, filed on Jun. 18, 2018, which claims the benefit of Korean Application No. 10-2018-0039476, filed on Apr. 5, 2018, U.S. Provisional Application No. 62/630,324, filed on Feb. 14, 2018, U.S. Provisional Application No. 62/548,912, filed on Aug. 22, 2017, and U.S. Provisional Application No. 62/520,560, filed on Jun. 16, 2017. The disclosures of the prior applications are incorporated by reference in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An object of the present invention is to provide a method of efficiently transmitting/receiving control information in a wireless communication and an apparatus therefor.

Technical tasks obtainable from the present invention are non-limited the abovementioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of performing communication by a user equipment in a wireless communication system is provided, wherein the method includes: receiving data in a time unit #n of a first frequency band, and transmitting A/N (Acknowledgement/Negative acknowledgement) for the data in a time unit #m+k of a second frequency band. In this case, subcarrier spacing of the first frequency band is different from subcarrier spacing of the second frequency band and a time unit #m of the second frequency band indicates the last time unit among a plurality of time units of the second frequency band corresponding to the time unit #n of the first frequency band.

To further achieve these and other advantages and in accordance with the purpose of the present invention, according to a different embodiment, a user equipment for use in a wireless communication system is provided, wherein the user equipment includes: an RF (Radio Frequency) module, and a processor, the processor configured to receive data in a time unit #n of a first frequency band, the processor configured to transmit A/N (Acknowledgement/Negative acknowledgement) for the data in a time unit #m+k of a second frequency band. In this case, subcarrier spacing of the first frequency band is different from subcarrier spacing of the second frequency band and a time unit #m of the second frequency band indicates the last time unit among a plurality of time units of the second frequency band corresponding to the time unit #n of the first frequency band.

To further achieve these and other advantages and in accordance with the purpose of the present invention, according to a further different embodiment, a method of performing communication by a base station in a wireless communication system is provided, wherein the base station includes: receiving data in a time unit #n of a first frequency band and transmitting A/N (Acknowledgement/Negative acknowledgement) for the data in a time unit #m+k of a second frequency band in response to the data. In this case, subcarrier spacing of the first frequency band is different from subcarrier spacing of the second frequency band and a time unit #m of the second frequency band indicates the last time unit among a plurality of time units of the second frequency band corresponding to the time unit #n of the first frequency band.

To further achieve these and other advantages and in accordance with the purpose of the present invention, according to a further different embodiment, a base station for use in a wireless communication system is provided, wherein the base station includes: an RF (Radio Frequency) module and a processor, the processor configured to transmit data in a time unit #n of a first frequency band, the processor configured to receive A/N (Acknowledgement/Negative acknowledgement) for the data in a time unit #m+k of a second frequency band. In this case, subcarrier spacing of the first frequency band is different from subcarrier spacing of the second frequency band and a time unit #m of the second frequency band indicates the last time unit among a plurality of time units of the second frequency band corresponding to the time unit #n of the first frequency band.

Preferably, each time unit includes the same number of OFDM (orthogonal frequency division multiplexing)-based symbols and a length of each time unit can be determined based on subcarrier spacing.

Preferably, the subcarrier spacing of the first frequency band may be smaller than the subcarrier spacing of the second frequency band.

Preferably, information on the k can be received via a control channel that schedules the data.

Preferably, the first frequency band corresponds to a Scell (Secondary cell) and the second frequency band may correspond to a cell configured to transmit a PUCCH (Physical Uplink Control Channel).

Preferably, the data is received via PDSCH (Physical Downlink Shared Channel) and the A/N can be transmitted via PUCCH (Physical uplink Control Channel).

Preferably, the wireless communication system may include 3GPP (3rd Generation Partnership Project)-based wireless communication system.

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
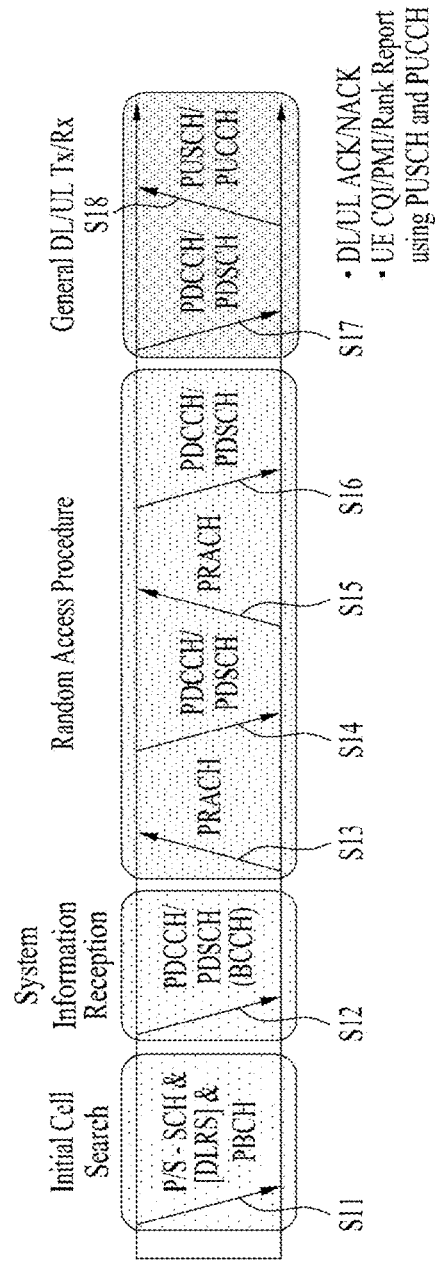
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2A:
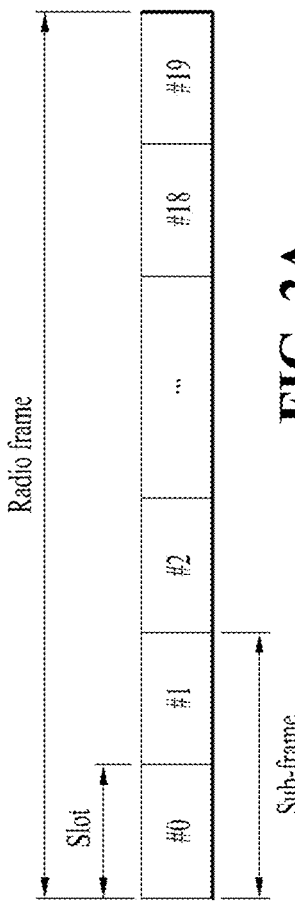
FIGS. 2A and 2B illustrate a radio frame structure.
Figure 2B:
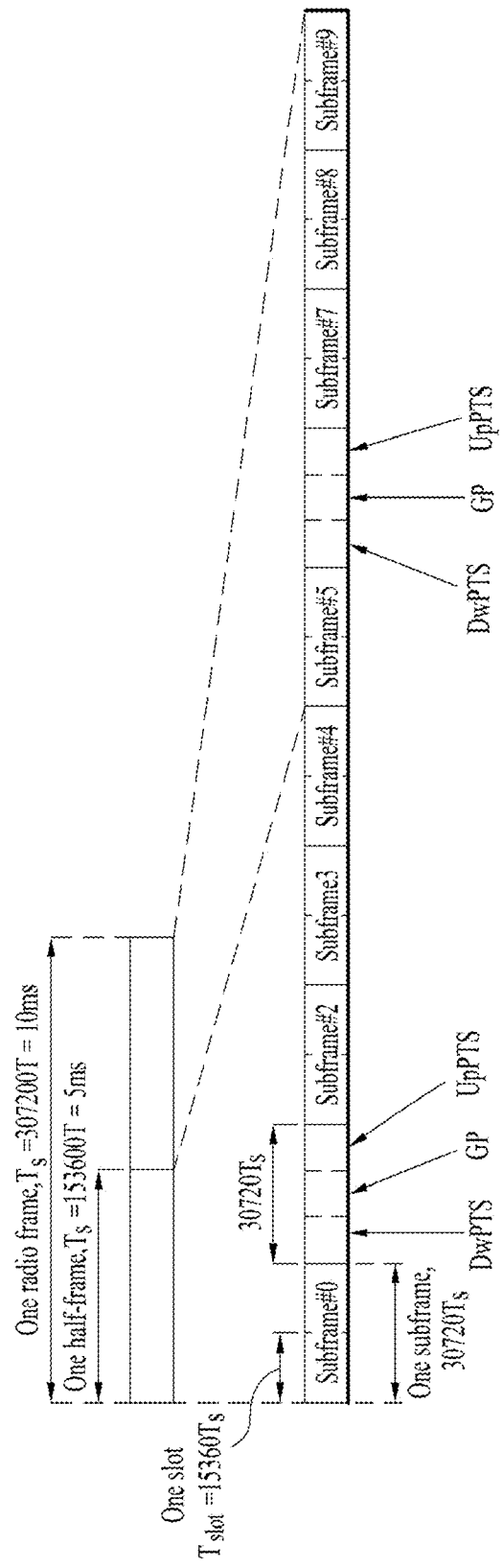

FIGS. 2A and 2B illustrate a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2A illustrates a type-1 radio frame structure. A downlink subframe includes 10 subframes each of which includes 2 slots in the time domain. A time for transmitting a subframe is defined as a transmission time interval (TTI).

For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2B illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
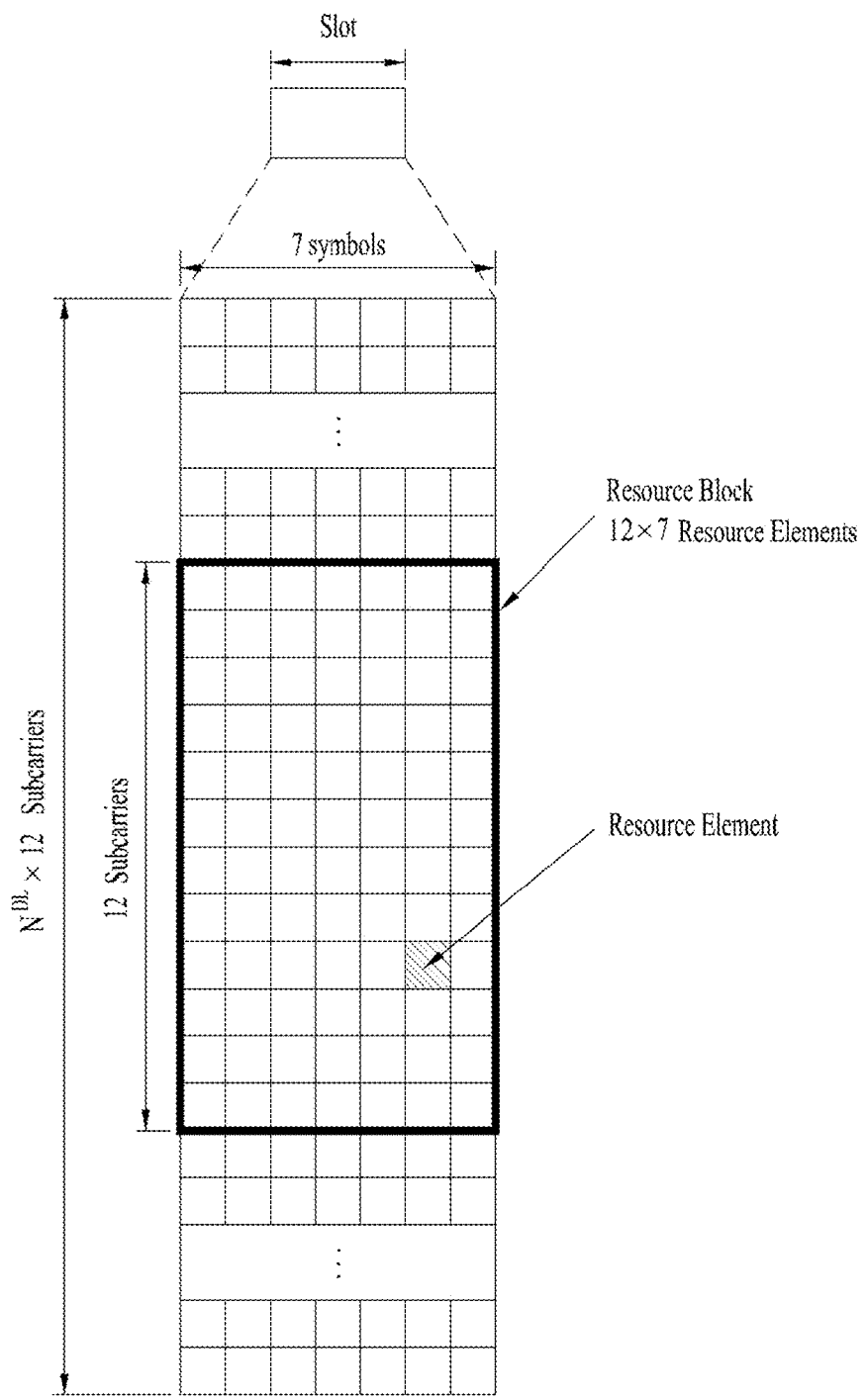
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
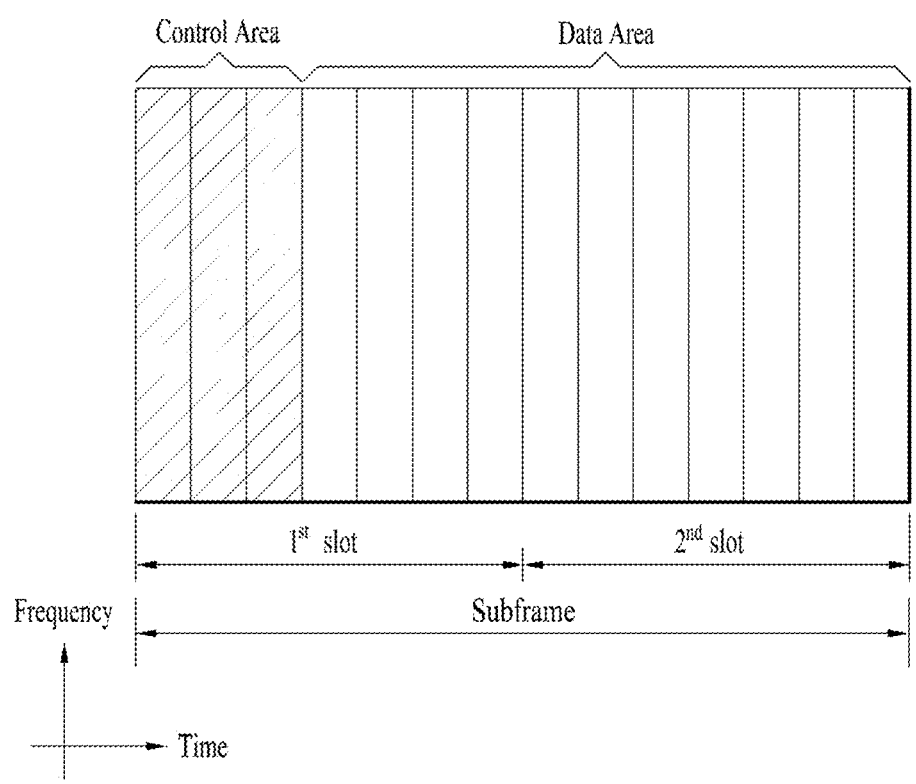
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
| --- | --- | --- | --- |
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO (Multiple Input Multiple Output)

Transmission mode 6: Closed-loop rank-1 precoding

Transmission mode 7: Single-antenna port (ports) transmission

Transmission mode 8: Double layer transmission (ports 7 and 8) or single-antenna port (port 7 or 8) transmission Transmission mode 9: Transmission through up to 8 layers (ports 7 to 14) or single-antenna port (port 7 or 8) transmission DCI Format Format 0: Resource grants for PUSCH transmission Format 1: Resource assignments for single codeword PDSCH transmission (transmission modes 1, 2 and 7)

Format 1A: Compact signaling of resource assignments for single codeword PDSCH (all modes)

Format 1B: Compact resource assignments for PDSCH using rank-1 closed loop precoding (mod 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments FIG. 5 illustrates a structure of an uplink subframe used in LTE(-A).

Figure 5:
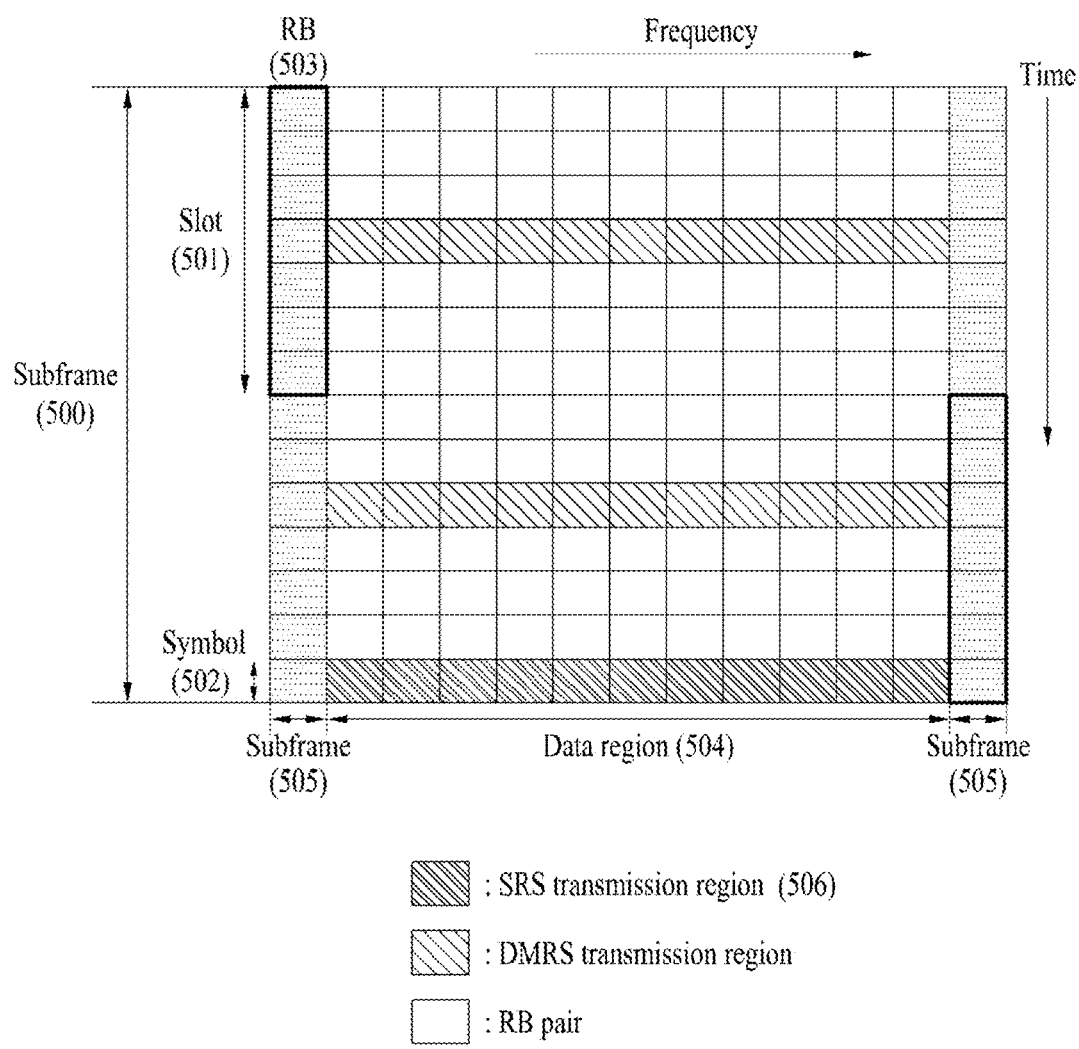
FIG. 5 illustrates the structure of an uplink subframe used in LTE(-A)

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 6:
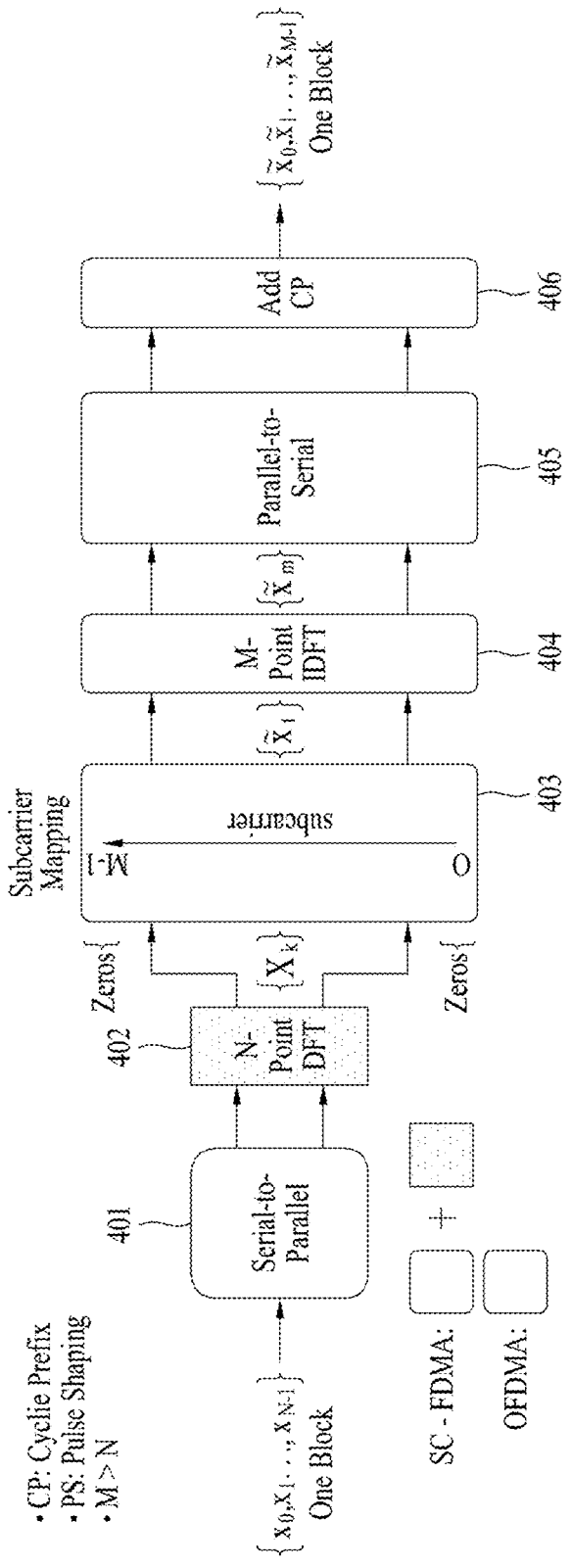
FIG. 6 illustrates Single Carrier Frequency Division Multiple Access (SC-FDMA) scheme and Orthogonal Frequency Division Multiple Access (OFDMA) scheme.

FIG. 6 illustrates SC-FDMA and OFDMA schemes. The 3GPP system employs OFDMA in downlink and uses SC-FDMA in uplink.

Referring to FIG. 6, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 7:
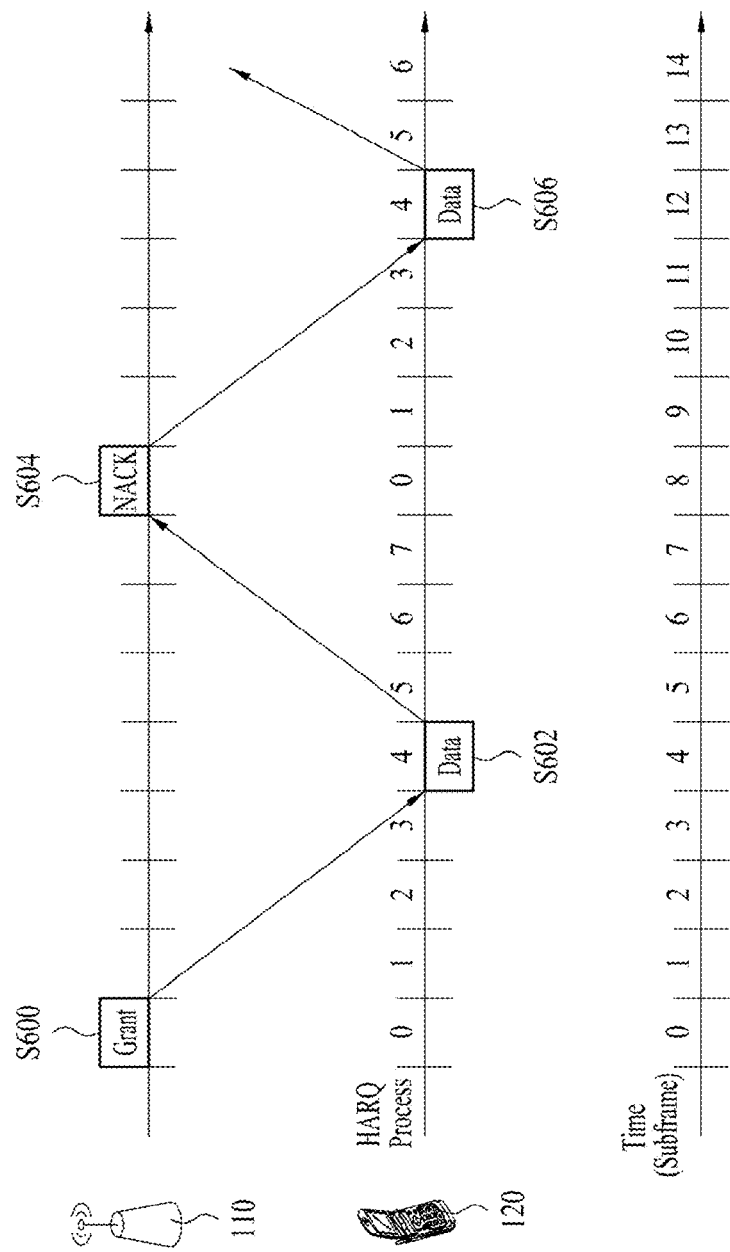
FIG. 7 illustrates UL HARQ (Uplink Hybrid Automatic Repeat reQuest) operation.

FIG. 7 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

Figure 8:
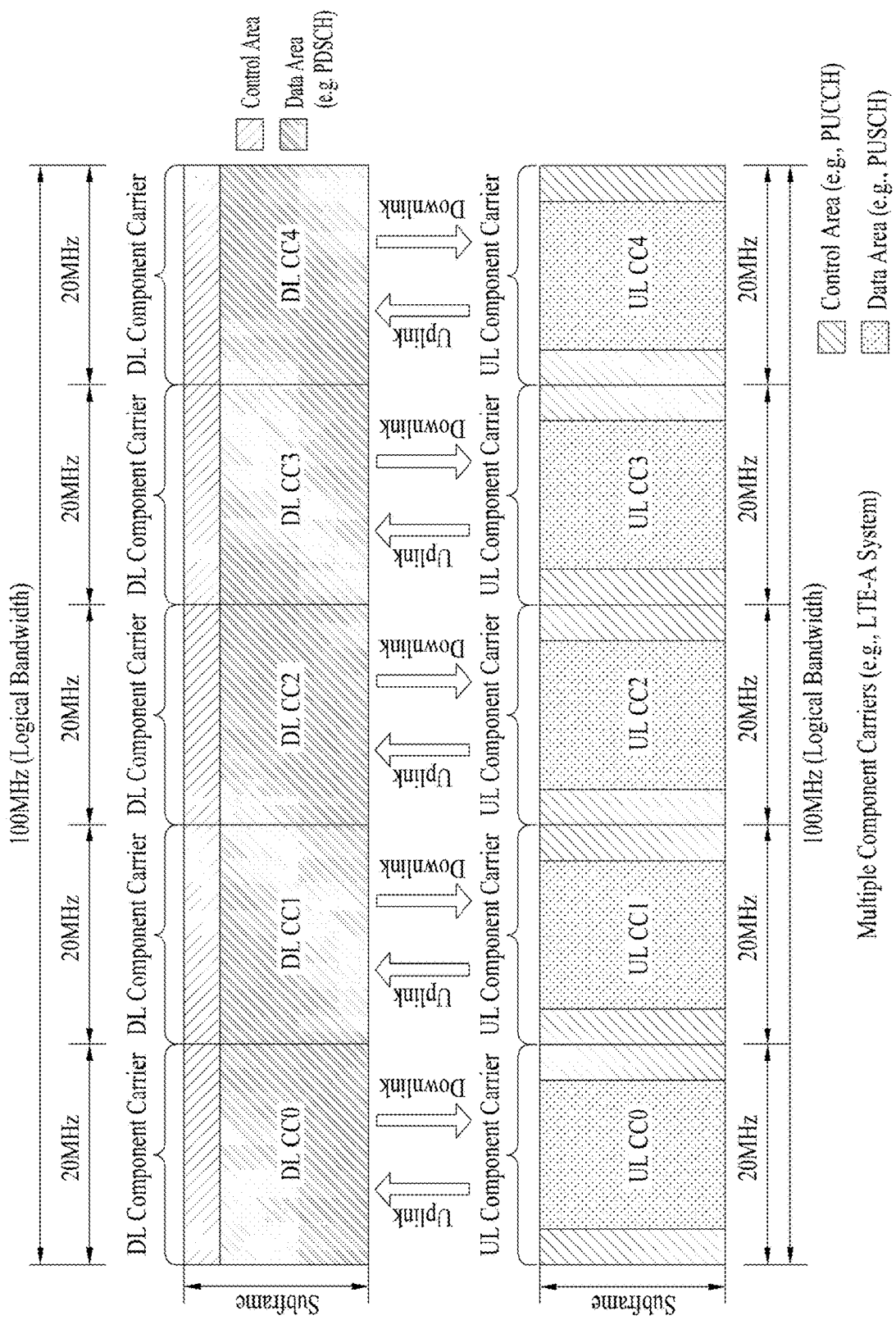
FIG. 8 illustrates a carrier aggregation (CA)-based wireless communication system.

FIG. 8 illustrates carrier aggregation (CA) communication system.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 9:
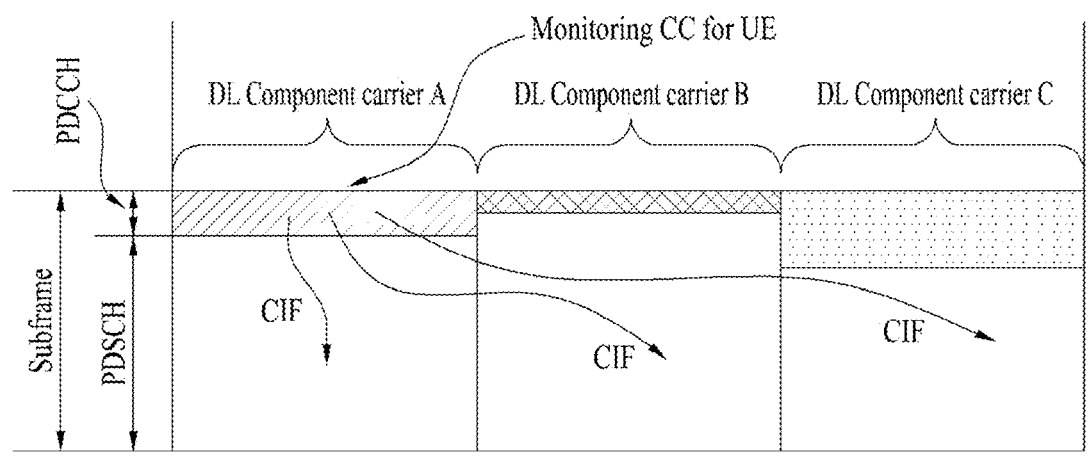
FIG. 9 illustrates cross-carrier scheduling.

FIG. 9 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 10:
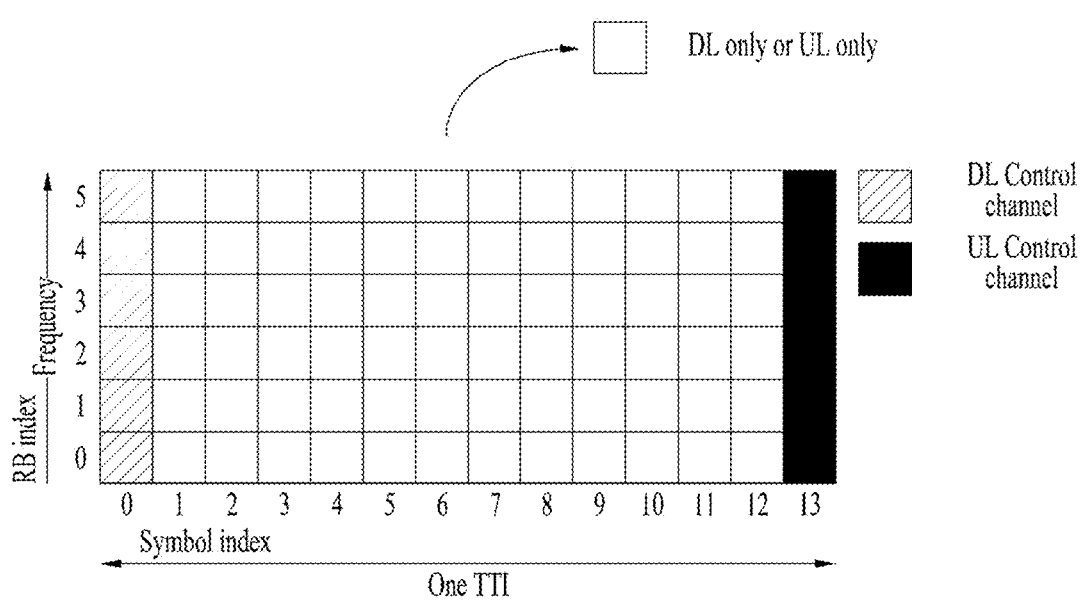
FIG. 10 illustrates a structure of a self-contained subframe.

In next-generation RAT (Radio Access Technology), a self-contained subframe is considered in order to minimize data transmission latency. FIG. 10 illustrates a self-contained subframe structure. In FIG. 10, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment: CA Scheme Between Different OFDM Numerologies

In 3GPP New RAT (NR) system environment, it may be able to differently configure OFDM numerology (e.g., sub-carrier spacing and OFDM symbol duration based on the subcarrier spacing) among a plurality of cells carrier aggregated on a signal UE. Hence, (absolute time) duration of a time resource configured by the same number of symbols (e.g., an SF, a slot, or a TTI (for clarity, commonly referred to as TU (Time Unit)) can be differently configured between CA cells. In this case, a symbol can include an OFDM symbol and an SC-FDMA symbol.

Figure 11:
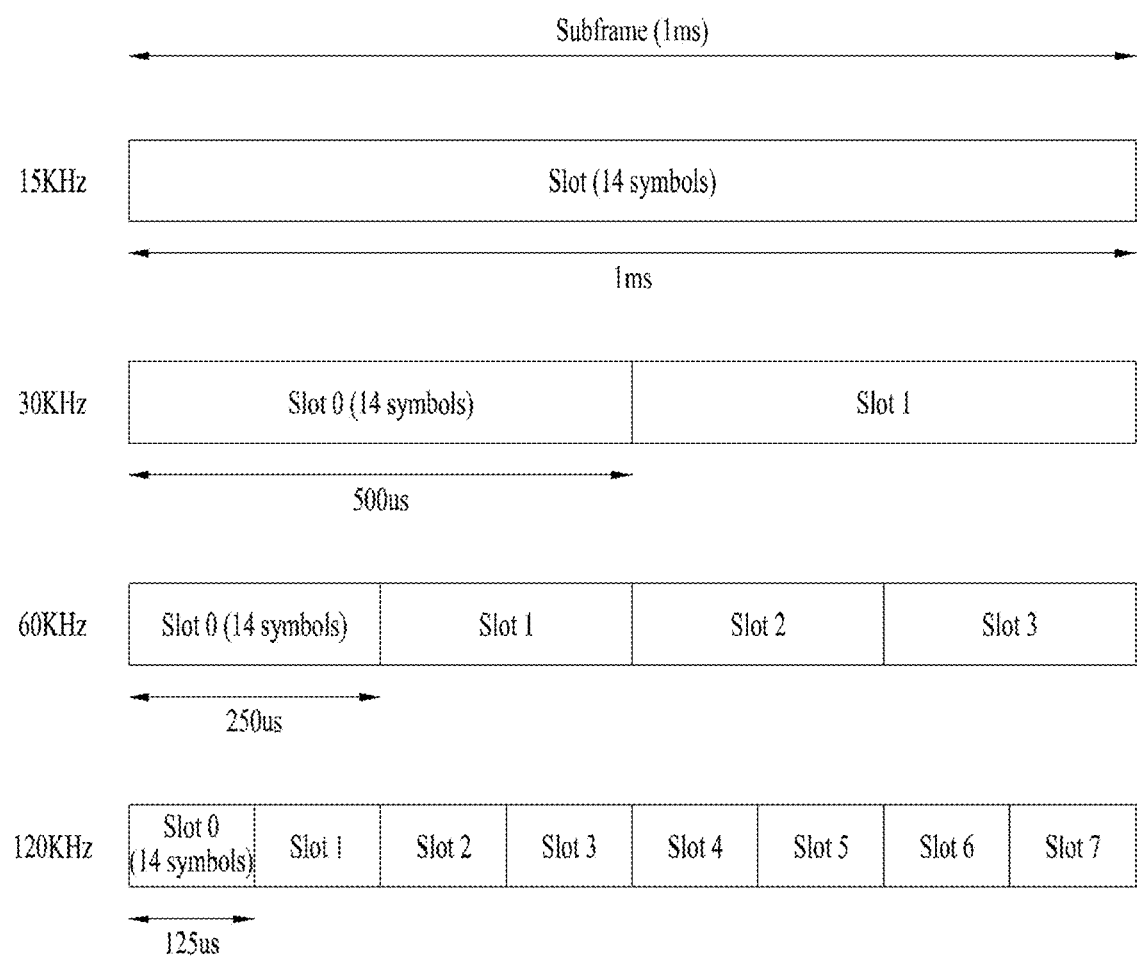
FIG. 11 illustrates a frame structure defined in 3GPP NR.

FIG. 11 illustrates a frame structure defined in 3GPP NR. Similar to a radio frame structure of LTE/LTE-A (refer to FIGS. 2A and 2B), in 3GPP NR, a radio frame includes 10 subframes and each of the subframes has a length of 1 ms. A subframe includes one or more slots and a slot length varies depending on an SCS. 3GPP NR supports SCS of 15 KHz, 30 KHz, 60 KHz, 120 KHz, and 240 KHz. In this case, a slot corresponds to a TTI shown in FIG. 10.

Table 4 illustrates a case that the number of symbols per slot, the number of slots per frame, and the number of slots per subframe vary according to an SCS.

TABLE 4

| SCS ($15*2^u$) | Number of symbols within slot | Number of slot within frame | Number of slot within subframe |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

In consideration of this, when CA is performed on cells having a different SCS and OS duration, it may consider an operation method described in the following for a DL/UL data-related HARQ procedure (e.g., when DL/UL data transmission in an Scell is cross-CC scheduled from a Pcell, A/N feedback is transmitted via the Pcell in response to DL data received in the Scell.) When CA is performed on cells having the same SCS and OS duration, although TU (e.g., slot) duration is differently configured between the cells, the same principle can be applied.

In the following, the present invention is explained centering on a case that a TU corresponds to a slot with reference to a frame structure of NR. The TU can be defined by various time resource units depending on a system. In the following description, a Pcell can be generalized by a cell configured to transmit a PUCCH (hereinafter, a PUCCH cell). For example, the PUCCH cell may include a specific Scell (e.g., Primary Secondary Cell (PSCell) configured to transmit a PUCCH. And, a Scell in which data is transmitted/received is generalized by a data cell or a scheduled cell and a cell in which grant DCI is transmitted can be generalized by a control cell or a scheduling cell. And, a cell can be replaced with a CC (Component Carrier). DCI is transmitted via PDCCH, UL data is transmitted via PUSCH, and DL data can be transmitted via PDSCH.

(A) Cross-CC Scheduling Between Different SCS

Figure 12:
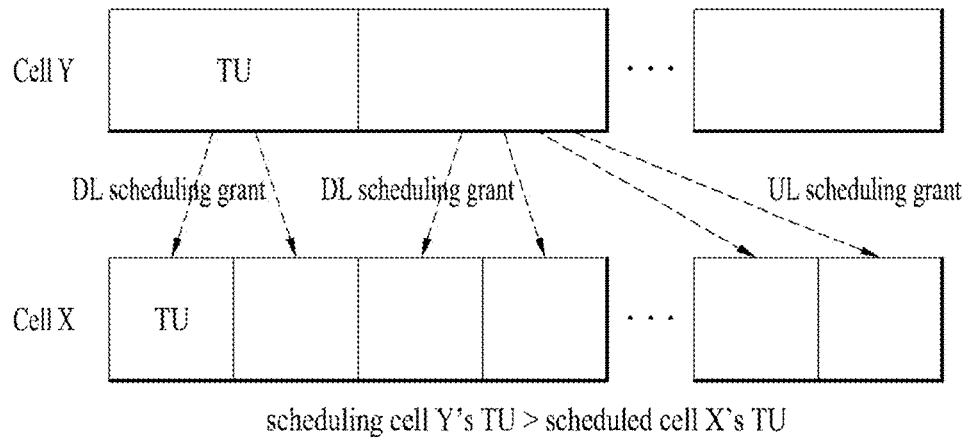
FIGS. 12 to 16 illustrate signal transmission according to the present invention.

FIG. 12 illustrates a case that a cell X having a big SCS (i.e., short OS duration or short TU (e.g., slot) duration) is configured to be scheduled by a cell Y having a small SCS (i.e., long OS duration or long TU duration). Referring to FIG. 12, DL/UL data transmission in the K (K>1) number of TUs of the cell X can be configured to be scheduled by one TU of the cell Y. In this case, a single TU of the cell Y and the K (e.g., multiple of 2) number of TUs of the cell X may have the same time duration. Specifically, Opt 1) when a DL/UL grant for scheduling the (maximum) K number of TUs of the cell X is transmitted/detected at the same time via a DL control channel transmission region (within a single TU) of the cell Y or Opt 2) when the K number of DL control channel transmission regions within a single TU of the cell Y is independently configured, it is able to transmit/detect a DL/UL grant for scheduling a different single TU in the cell X via each region. In this case, a TU to be scheduled from among the K number of TUs of the cell X corresponding to single TU duration of the cell Y can be indicated via a DL/UL grant.

In the abovementioned methods (i.e., Opt 1), an operation of simultaneously detecting/receiving multiple DCIs can be differently supported according to parallel (decoding/encoding) processing capability of UE implementation for a plurality of DL/UL data channels (and multiple PDCCHs on which DL/UL grant DCI scheduling the channels is carried). For example, in case of a UE supporting a cross-CC scheduling operation between a scheduling cell Y operating with a specific SCS and a scheduled cell X operating with an SCS greater than the specific SCS as much as K times, it is able to regulate UE capability/implementation to make the UE simultaneously detect/receive (and simultaneously perform maximum K number of DL (UL) data processing) (at least) maximum K number of DL (UL) grant DCI via a DL control channel transmission/search (resource) region. As a different example, (under the cross-CC scheduling configuration), the maximum number of DL (UL) grant DCI (e.g., Lu) capable of being simultaneously detected/received via a DL control channel transmission/search (resource) region may vary depending on a UE implementation. In particular, a UE can report capability (i.e., Lu value) of the UE related to the operation above to a base station. As a further different example, (under the cross-CC scheduling configuration of FIG. 12), a UE can receive a configuration of the maximum number (e.g., Lc) of DL (UL) grant DCI capable of being simultaneously scheduled/transmitted from the base station (via a DL control channel transmission/search (resource) region). Hence, the UE can perform blind decoding by assuming a state that the UE is able to detect/receive the maximum Lc number of DL (UL) grant DCI at the same time.

The abovementioned method/operation can be similarly applied to a situation that a self-CC scheduling is configured in a manner that DL/UL data transmitted via a random cell is scheduled by DCI transmitted via the cell itself (in a state that DL grant DCI-to-DL data timing (or UL grant DCI-to-UL data timing) is dynamically indicated via DCI) or a situation that a cross-CC scheduling is configured between a scheduled cell X and a scheduling cell Y operating with the same SCS. For example, the maximum number of DL (UL) grant DCIs (e.g., Lu) capable of being simultaneously detected/received via a DL control channel transmission/search (resource) region can be differentiated according to UE implementation. Hence, a UE can report capability (i.e., Lu value) of the UE related to the operation above to a base station. As a different example, a UE can receive a configuration of the maximum number (e.g., Lc) of DL (UL) grant DCI capable of being simultaneously scheduled/transmitted from the base station (via a DL control channel transmission/search (resource) region). Hence, the UE can perform blind decoding by assuming a state that the UE is able to detect/receive the maximum Lc number of DL (UL) grant DCI at the same time.

Meanwhile, when a plurality of DL grant DCIs schedule a plurality of different DL data (e.g., PDSCH) transmitted on a single CC (e.g., data CC), it is able to configure a plurality of the DL grant DCIs to be transmitted via the same slot (same control resource set or same PDCCH search space within the slot) within a specific CC (e.g., control CC). In this case, the control CC corresponds to a CC on which PDCCH is monitored by a UE. The control CC can be configured to be identical to a CC (e.g., data CC) on which data transmission/reception is performed according to a cross-CC scheduling configuration. Or, the control CC can be configured by a CC different from a data CC. Meanwhile, when DL data is transmitted via a specific CC to configure a dynamic HARQ-ACK payload (codebook), it may apply counter-DAI (and/or total-DAI) signaling to indicate a scheduling order of the DL data (on the basis of a CC index) (and/or the total number of scheduled DL data (until a current slot)) via DL grant DCI. When a plurality of DL grant DCIs are transmitted in the same slot (same control resource set or same PDCCH search space within the slot) in response to a plurality of DL data transmitted on the same data CC, it is necessary to have a reference for determining an order/size of a counter-DAI value signaled by a plurality of the DCIs. To this end, it may consider a method of determining the counter-DAI value according to one of indexes described in the following (e.g., a low index is mapped to a small counter-DAI value).

Figure 13:
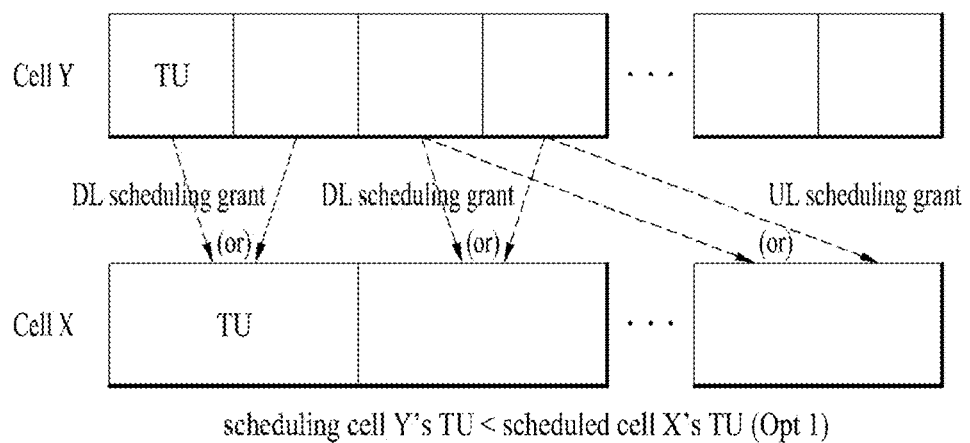
Figure 13:
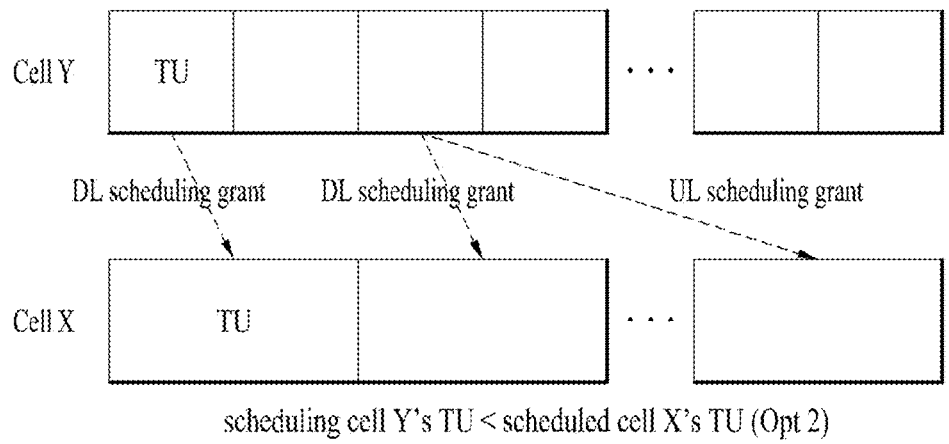

1) CCE index
2) PDCCH candidate index used for transmitting DL grant DCI
3) PDCCH search space in which DL grant PDCCH is transmitted or an index of a control resource set
4) Slot index (of data CC) at which DL data is transmitted
5) First or last symbol index allocated to transmit DL data
6) Index of DL data resource candidate (combined by slot offset/starting symbol/duration) configured via RRC FIG. 13 illustrates a case that a cell X having a small SCS (i.e., long OS duration or long TU duration) is configured to be scheduled by a cell Y having a big SCS (i.e., short OS duration or short TU duration). Referring to FIG. 13, DL/UL data transmission in a single TU of the cell X can be configured to be scheduled by all or a part (e.g., 1 TU) of the N (N>1) number of TUs of the cell Y. In this case, the N (e.g., multiple of 2) number of TUs of the cell Y and a single TU of the cell X may have the same time duration (for clarity, N number of TUs of the cell Y aligned with the single TU of the cell X). Specifically, Opt 1) a DL/UL grant for scheduling a single TU of the cell X is transmitted/detected via a TU belonging to a plurality of TUs (i.e., TU group) corresponding to all or a part of the N number of TUs of the cell Y (FIG. 13 (a)) or Opt 2) a DL/UL grant for scheduling a TU of the cell X can be transmitted/detected via a specific TU (e.g., a first TU among the N number of TUs or a TU of the cell Y overlapped with a first OS within a TU of the cell X over time) among the N number of TUs of the cell Y (FIG. 13 (b)).

In the abovementioned methods (i.e., Opt 1), an operation of simultaneously detecting/receiving DCI can be differently supported according to buffering processing capability of UE implementation for a DL/UL data channel. For example, in case of a UE supporting a cross-CC scheduling operation between a scheduled cell X operating with a specific SCS and a scheduling cell Y operating with an SCS greater than the specific SCS as much as K times, it is able to regulate UE capability/implementation to make the UE detect/receive DL (UL) grant DCI (and perform buffering processing of DL data) scheduling a TU of the cell X via any TU among the N number of TUs of the cell Y aligned with the TU of the cell X. As a different example, (under the cross-CC scheduling configuration illustrated in FIG. 13), TU timing (of the cell Y) capable of detecting/receiving DL (UL) grant DCI scheduling the TU of the cell X among the N number of TUs of the cell Y can be differentiated according to UE implementation. Hence, a UE can report capability (i.e., TU timing information of the cell Y capable of detecting/receiving DL (UL) grant DCI scheduling the TU of the cell X) of the UE related to the operation above to a base station.

As a further different example, (under the cross-CC scheduling configuration illustrated in FIG. 13), it is able to configure DL (UL) grant DCI scheduling the TU of the cell X to be detected/received via a TU (of the cell Y) equal to or faster than DL (UL) data starting symbol/timing transmitted via the TU of the cell X only among the N number of TUs of the cell Y.

Meanwhile, in case of the Opt 1, TU timing at which a DL/UL grant is transmitted within a TU group may vary and each of a DL grant and a UL grant can be transmitted via a different TU within the TU group. Hence, a UE can sequentially perform a blind decoding operation on DL control channel transmission regions of all TUs belonging to the TU group. If all DL/UL grants for the cell X are detected within a TU group of the cell Y, the UE may not perform the blind decoding operation on DL control channel transmission regions within the remaining TUs. And, in case of the Opt 1, a DL control channel detection operation of a UE can be performed in a manner that a BD count (e.g., Nb times) for a DL control channel assigned by single TU scheduling of a cell X is distributed to a plurality of TUs (e.g., Ns number of TUs) constructing a TU group of a cell Y (e.g., BD is performed (Nb/Ns) times in each TU). Meanwhile, according to the Opt 2, a specific TU transmitting a DL/UL grant for the cell X among the N number of TUs of the cell Y can be configured via higher layer signaling (e.g., RRC signaling) or can be automatically designated based on a predefined rule (e.g., a first TU among the N number of TUs of the Y cell positioned at the same timing of TU of the cell X).

Meanwhile, when a cell X having a long TU length is configured to perform cross-scheduling on a cell Y having a short TU length, since scheduling (together with DL/UL grant DCI transmission) is performed on a plurality of TUs of the cell Y in a single TU of the cell X, DL control resource burden can be increased. Hence, cross-CC scheduling can be permitted only when a difference between a long TU length of the (scheduling) cell X and a short TU length of the (scheduled) cell Y is equal to or less than a specific level (e.g., when a TU of the cell X is equal to or less than a specific multiple of a TU of the cell Y). As a different method, it may consider a method of setting a limit on the number of cell Ys having a short TU configured to be cross-CC scheduled by a cell X having a long TU to make the number to be a value equal to or less than a specific value.

(B) HARQ-ACK Timing for CA with Different SCS

1) DL Data-to-HARQ-ACK

In the CA situation of 3GPP NR system, SCS or OS duration (or a TU length) can be differently configured between a cell (e.g., Scell) in which DL data is transmitted and a cell (e.g., Pcell) in which A/N feedback is transmitted in response to the DL data. In this case, Opt 1-1) A/N timing (e.g., delay between DL data reception and A/N transmission) can be configured on the basis of a TU length of the Scell in which the DL data is transmitted (e.g., A/N timing (candidate set) is configured by a multiple of Scell TU length) or Opt 1-2) the A/N timing can be configured on the basis of a TU length of the Pcell in which the A/N feedback is transmitted (e.g., A/N timing (candidate set) is configured by a multiple of Pcell TU length). The Opt 1-1 can be comprehended as the A/N timing is configured on the basis of numerology used for transmitting DL data (e.g., PDSCH transmission). The Opt 1-2 can be comprehended as the A/N timing is configured on the basis of numerology used for performing A/N transmission (e.g., PUCCH transmission). For clarity, A/N timing configured based on the Opt 1-1/1-2 is referred to as temp A/N timing. In this case, information on the A/N timing (e.g., Number of TUs) can be indicated via a DL grant that schedules DL data.

First of all, in case of the Opt 1-1, actually applied actual A/N timing of the Pcell can be determined as an overlapped timing with a timing appearing after temp A/N timing (e.g., time corresponding to N number of Scell TUs) from the timing at which DL data is received on Scell, or an earliest TU (or UL control channel transmission (for A/N)) duration) on the Pcell appearing on or after the overlapped timing. Specifically, when it is assumed that DL data is received at Scell TU #k, for Pcell TU length<Scell TU length, a specific (e.g., first or last) Pcell TU #n among a plurality of Pcell TUs positioned at the same timing with Scell TU #(k+N) can be determined as actual A/N timing. In this case, among the a plurality of the Pcell TUs positioned at the same timing with the Scell SF #(k+N), the Pcell TU #n corresponding to the actual A/N timing can be configured via higher layer signaling (e.g., RRC signaling), can be dynamically indicated via DL grant DCI, or can be automatically designated based on a predefined rule (e.g., the first or the last TU among a plurality of the Pcell TUs). In addition, when the number of candidate A/N timing types is indicated via a DL grant, DL data of Scell can be configured to have less number of types compared to DL data of Pcell (e.g., when TU lengths of the two cells have a relationship of N times, a value corresponding to 1/N). In this case, an interval between candidate A/N timings corresponding to DL data of each cell can be configured by the same value between the two cells.

On the contrary, for Pcell TU length>Scell TU length, a Pcell TU #n positioned at the same timing with Scell TU #(k+N) or a Pcell TU #(n+1) appearing immediately after the Pcell TU #n can be determined as actual HARQ timing. In this case, the Pcell TU #n or the Pcell TU #(n+1) corresponding to the actual A/N timing can be configured via higher layer signaling (e.g., RRC signaling), can be dynamically indicated via DL grant DCI, or can be automatically designated based on a predefined rule, For example, if PUCCH transmission duration or the number of symbols is equal to or less than a specific value in Pcell, the Pcell TU #n is designated as the actual A/N timing. If the PUCCH transmission duration or the number of symbols exceeds the specific value, the Pcell TU #(n+1) is designated as the actual A/N timing. And/or, if an order of Scell TU #(k+N) is equal to or less than a specific value among a plurality of the Scell TUs, which is in the same time as the Pcell TU #n, the Pcell TU #n is designated as the actual A/N timing. If the order of the Scell TU #(k+N) exceeds the specific value, the Pcell TU #(n+1) is designated as the actual A/N timing.

In addition, an interval (N) between candidate A/N timings capable of being indicated via a DL grant can be configured, so that DL data of Scell has a longer interval compared to DL data of Pcell (e.g., when TU lengths of the two cells have a relationship of N times, a multiple of N). In this case, the number of candidate A/N timings can be configured by the same value between the two cells.

And, in case of the Opt 1-2, an actually applied actual A/N timing on Pcell can be determined as TU (or (A/N) UL control channel transmission) duration appearing after temp A/N timing (e.g., time corresponding to the M number of Pcell TUs) from an overlapped timing with DL data reception timing on Scell, or an earliest TU (or (A/N) UL control channel transmission) duration on Pcell existing on or after the overlapped timing. Specifically, when it is assumed that DL data reception timing corresponds to Scell TU #n, for Pcell TU length<Scell TU length (i.e., Pcell SCS>Scell SCS), a Pcell TU #(k+M) can be determined as actual A/N timing on the basis of a specific Pcell TU #k (e.g., the first or the last) among a plurality of Pcell TUs positioned at the same timing with Scell TU #n. In the foregoing description, "a specific Pcell TU #k (hereinafter, HARQ-ACK reference TU) among a plurality of Pcell TUs" can be configured via higher layer signaling (e.g., RRC signaling), can be dynamically indicated via DL grant DCI, or can be designated based on a predefined rule (e.g., the first or the last TU among a plurality of the Pcell TUs). On the contrary, for 'Pull TU length>Scell TU length' or 'Pull TU length=Scell TU length' (i.e., Pcell SCS<=Scell SCS), a Pcell TU #(k+M) can be determined as actual A/N timing on the basis of a Pcell TU #k positioned at the same timing with Scell TU #n.

Meanwhile, when a cell X having a long TU length is configured to transmit A/N in response to DL data reception in a cell Y having a short TU length (i.e., cross-CC UCI transmission), since it is necessary to perform multiple A/N transmissions (PUCCH transmission) in response to multiple DL data in the cell Y in a single TU of the cell X, UL control resource burden can be increased. Hence, cross-CC UCI transmission can be permitted only when a difference between a long TU length of the (UL control) cell X and a short TU length of the (DL data) cell Y is equal to or less than a specific level (e.g., when a TU of the cell X is equal to or less than a specific multiple of a TU of the cell Y). As a different method, it may consider a method of setting a limit on the number of cell Ys having a (DL data) short TU configured to transmit UCI via the (UL control) cell X having a long TU to make the number to be a value equal to or less than a specific value.

2) UL Grant DCI-to-UL Data

Meanwhile, in case of UL HARQ, SCS or OS duration (or a TU length) can be differently configured between a cell (e.g., Pcell) in which a UL grant is transmitted and a cell (e.g., Scell) in which UL data is transmitted in response to the UL grant. In this case, Opt 2-1) HARQ timing (e.g., delay between UL grant reception and UL data transmission) can be configured on the basis of a TU length (e.g., HARQ timing (candidate set) is configured by a multiple of a Pcell TU length) of the Scell in which the UL grant is transmitted or Opt 2-2) the HARQ timing can be configured on the basis of a TU length (e.g., HARQ timing (candidate set) is configured by a multiple of a Scell TU length) of the Scell in which the UL data is transmitted. The Opt 2-1 can be comprehended as the HARQ timing is configured on the basis of numerology used for transmitting UL grant (e.g., PDCCH transmission). The Opt 2-2 can be comprehended as the HARQ timing is configured on the basis of numerology used for performing UL data transmission (e.g., PUSCH transmission). For clarity, HARQ timing configured based on the Opt 2-1/2-2 is referred to as temp HARQ timing. In this case, information on the HARQ timing (e.g., number of TUs) can be indicated via a UL grant.

First of all, in case of the Opt 2-1, actually applied actual HARQ timing on the Scell can be determined by an overlapped timing with timing appearing after temp HARQ timing (e.g., time corresponding to K number of Pcell TUs) from the timing at which a UL grant is received on Pcell, or an earliest TU (or UL data channel transmission) on the Scell appearing on or after the overlapped timing.

Meanwhile, in case of the Opt 2-2, actually applied actual HARQ timing on Scell can be determined as TU (or UL data channel transmission) duration appearing after temp HARQ timing (e.g., time corresponding to the L number of Scell TUs) from an overlapped timing with the UL grant reception timing on Pcell, or an earliest TU (or UL data channel transmission) duration on Scell existing on or after the overlapped timing. Specifically, when it is assumed that UL grant reception timing corresponds to Pcell TU #n, for Pcell TU length>Scell TU length (i.e., Pcell SCS<Scell SCS), a Scell TU #(k+L) can be determined as actual HARQ timing on the basis of a specific Scell TU #k (e.g., the first or the last) among a plurality of Scell TUs positioned at the same timing with Pcell TU #n. In the foregoing description, "a specific Scell TU #k (hereinafter, UL-HARQ reference TU) among a plurality of Scell TUs" can be configured via higher layer signaling (e.g., RRC signaling), can be dynamically indicated via UL grant DCI, or can be designated based on a predefined rule (e.g., the first or the last TU among a plurality of the Scell TUs). On the contrary, if for 'Pcell TU length<Scell TU length' or 'Pcell TU length=Scell TU length' (i.e., Pcell SCS>=Scell SCS), a Scell TU #(k+L) can be determined as actual HARQ timing on the basis of a Scell TU #k positioned at the same timing with Pcell TU #n.

3) DL Grant DCI-to-DL Data

Meanwhile, in case of DL HARQ, SCS or OS duration (or a TU length) can be differently configured between a cell (e.g., Pcell) in which a DL grant is transmitted and a cell (e.g., Scell) in which DL data is transmitted in response to the DL grant. In this case, Opt 3-1) HARQ timing (e.g., delay between DL grant reception and DL data transmission) can be configured on the basis of a TU length (e.g., HARQ timing (candidate set) is configured by a multiple of a Pcell TU length) of the Pcell in which the DL grant is transmitted or Opt 3-2) the HARQ timing can be configured on the basis of a TU length (e.g., HARQ timing (candidate set) is configured by a multiple of a Scell TU length) of the Scell in which the DL data is transmitted. The Opt 3-1 can be comprehended as the HARQ timing is configured on the basis of numerology used for transmitting DL grant (e.g., PDCCH transmission). The Opt 3-2 can be comprehended as the HARQ timing is configured on the basis of numerology used for performing DL data transmission (e.g., PDSCH transmission). For clarity, HARQ timing configured based on the Opt 3-1/3-2 is referred to as temp HARQ timing. In this case, information on the HARQ timing (e.g., number of TUs) can be indicated via a DL grant.

First of all, in case of the Opt 3-1, actually applied actual HARQ timing of the Scell can be determined as an overlapped timing overlapped with timing appearing after temp HARQ timing (e.g., time corresponding to K number of Pcell TUs) from the timing at which a DL grant is received on Pcell, or an earliest TU (or DL data channel transmission) on the Scell appearing after the overlapped timing.

Meanwhile, in case of the Opt 3-2, actually applied actual HARQ timing on Scell can be determined as TU (or DL data channel transmission) duration appearing after temp HARQ timing (e.g., time corresponding to the L number of Scell TUs) from a overlapped timing with the DL grant reception timing on Pcell, or an earliest TU (or DL data channel transmission) duration on Scell existing on or after the overlapped timing. Specifically, when it is assumed that DL grant reception timing corresponds to Pcell TU #n, for Pcell TU length>Scell TU length is satisfied (i.e., Pcell SCS<Scell SCS), a Scell TU #(k+L) can be determined as actual HARQ timing on the basis of a specific Scell TU #k (e.g., the first or the last) among a plurality of Scell TUs positioned at the same timing with Pcell TU #n. In the foregoing description, "a specific Scell TU #k (hereinafter, DL-HARQ reference TU) among a plurality of Scell TUs" can be configured via higher layer signaling (e.g., RRC signaling), can be dynamically indicated via DL grant DCI, or can be designated based on a predefined rule (e.g., the first or the last TU among a plurality of the Scell TUs). On the contrary, for 'Pcell TU length<Scell TU length' or 'Pcell TU length=Scell TU length' (i.e., Pcell SCS>=Scell SCS), a Scell TU #(k+L) can be determined as actual HARQ timing on the basis of a Scell TU #k positioned at the same timing with Pcell TU #n.

Preferably, in the Opt 1-2, "the specific Pcell TU #k among a plurality of the Pcell TUs" for the HARQ-ACK reference TU can be configured as the last TU among a plurality of the Pcell TUs. In order to transmit A/N after DL data is received, certain amount of processing time is necessary. For example, if the HARQ-ACK reference TU is designated as the first TU among a plurality of Pcell TUs, it is unable to transmit A/N in the HARQ-ACK reference TU. Hence, if information on A/N timing is indicated via DL grant DCI, information indicating a specific TU (e.g., a TU positioned between the HARQ-ACK reference TU and a TU within processing time necessary for transmitting A/N) is not valid. Hence, since it is unable to use a part of the information on the A/N timing, signaling information is restricted. For example, if the A/N timing is defined by a TU offset having values ranging from 0 to N−1, it is unable to use values ranging from 0 to L−1 (L<N) for signaling. And, since a length of a slot is variously provided according to SCS, the number (L) of TUs within processing time necessary for transmitting A/N varies. As a result, signaling information is restricted and system complexity can be increased.

Figure 14:
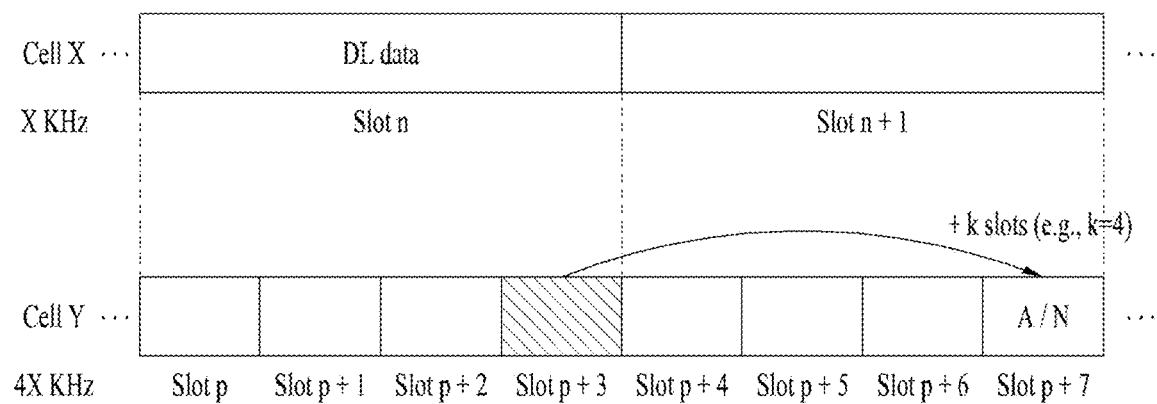

FIG. 14 illustrates signal transmission according to the option 1-2. Referring to FIG. 14, DL data is received in a slot #n of a cell X (SCS: X KHz). If the cell X is not a PUCCH cell (e.g., Pcell), it may be able to transmit A/N in a PUCCH cell (e.g., cell Y) in response to the DL data. In this case, since SCS of the cell Y corresponds to 4×KHz, the slot #n of the cell X corresponds/is aligned to/with 4 slots of the cell Y (e.g., slot #p to slot #p+3) and A/N for the DL data can be transmitted after k slots (e.g., 4 slots) on the basis of the last slot (i.e., slot #p+3) among the 4 slots of the cell Y corresponding to the slot #n of the cell X. Information on k can be indicated via control information (e.g., DL grant DCI) that schedules the DL data. In this case, the k may correspond to an integer equal to or greater than 0. The k is configured based on numerology used for transmitting A/N (e.g., PUCCH transmission). In this case, the DL data and the DL grant DCI can be received via PDSCH and PDCCH, respectively. In this case, as described later, a cell can be replaced with a subband.

In the option 2-2, a specific Scell TU #k for a UL-HARQ reference TU can be configured by the last TU among a plurality of Scell TUs or can be configured by one of a plurality of the Scell TUs via higher layer signaling (e.g., RRC signaling). In order to transmit UL data after UL grant DCI is received, a certain amount of processing time is necessary. In particular, similar to HARQ-ACK reference TU, the UL-HARQ reference TU can be designated by the last TU among a plurality of the Scell TUs. Meanwhile, in order to maintain unity between UL data processing and DL data processing, similar to DL-HARQ reference TU described later, the UL-HARQ reference TU can be designated by the first TU among a plurality of the Scell TUs.

Figure 15:
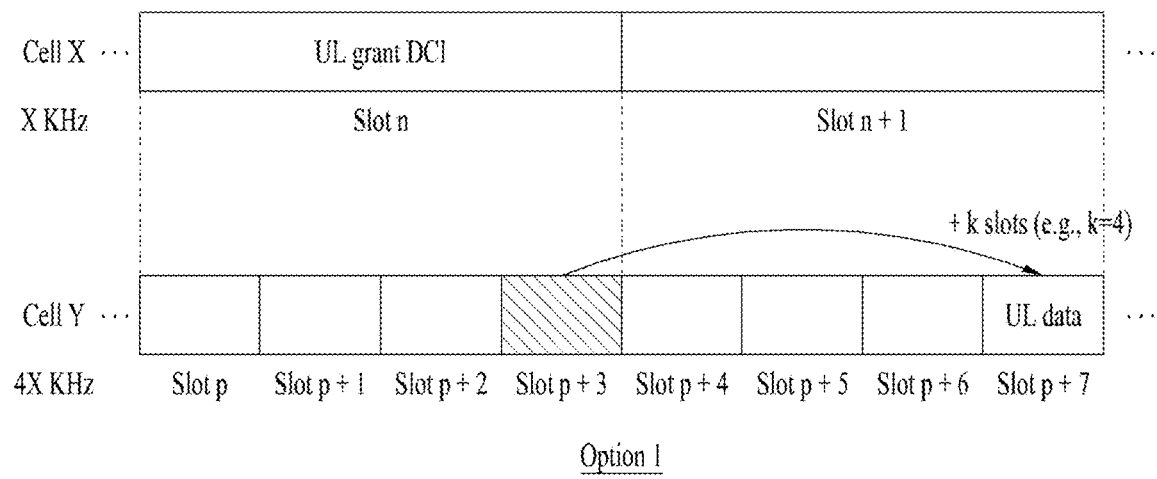
Figure 15:
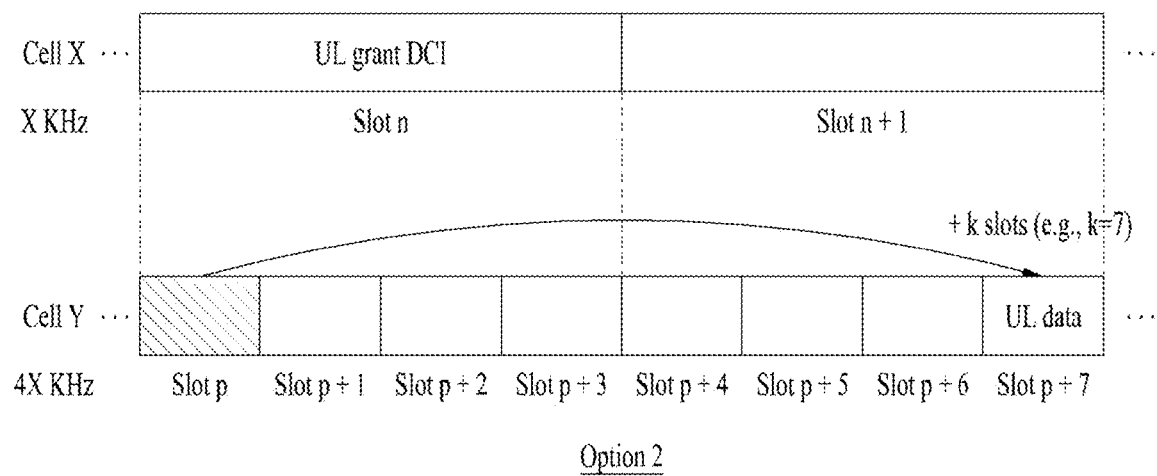

FIG. 15 illustrates signal transmission according to the option 2-2. Referring to FIG. 15, UL grant DCI is received in a slot #n of a cell X (SCS: X KHz) and UL data can be transmitted in a cell Y (SCS: 4×KHz). In this case, since SCS of the cell Y corresponds to 4×KHz, the slot #n of the cell X corresponds/is aligned to/with 4 slots of the cell Y (e.g., slot #p to slot #p+3) and the UL data can be transmitted after k slots (e.g., 4 slots) on the basis of the last slot (i.e., slot #p+3) among the 4 slots of the cell Y corresponding to the slot #n of the cell X (option 1) or can be transmitted after k (e.g., 7) slots on the basis of the first slot (i.e., slot #p) (option 2). Information on k can be indicated via UL grant DCI. In this case, the k may correspond to an integer equal to or greater than 0. The k is configured based on numerology used for transmitting UL data (e.g., PUSCH transmission). In this case, the UL data can be transmitted via PUSCH and the UL grant DCI can be received via PDCCH. In this case, as described later, a cell can be replaced with a subband.

In the option 3-2, a specific Scell TU #k for a DL-HARQ reference TU can be configured by the first TU among a plurality of Scell TUs. Since it is able to receive DL grant DCI and DL data at the same time, if HARQ-ACK reference TU is designated by the first TU among a plurality of the Scell TUs, it is able to increase a use efficiency of a DL data transmission resource.

Figure 16:
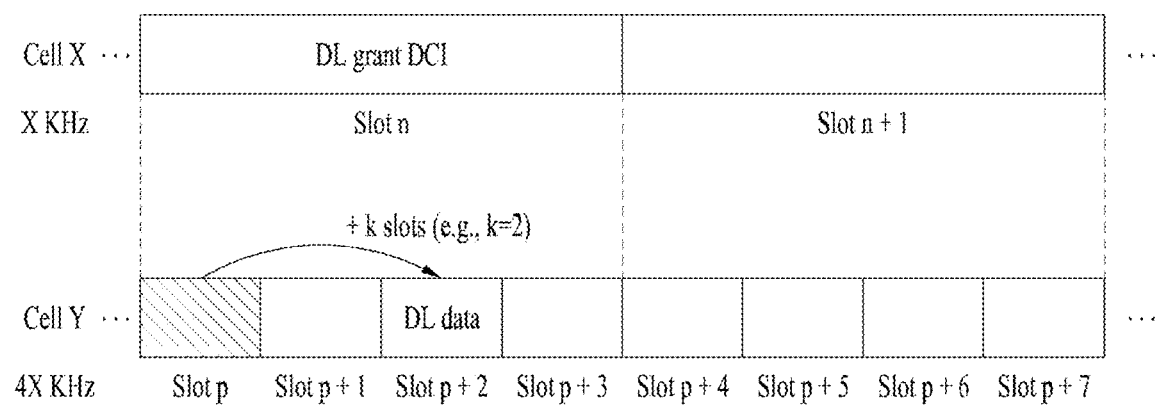

FIG. 16 illustrates signal transmission according to the option 3-2. Referring to FIG. 16, DL grant DCI is received in a slot #n of a cell X (SCS: X KHz) and DL data can be transmitted in a cell Y (SCS: 4×KHz). In this case, since SCS of the cell Y corresponds to 4×KHz, the slot #n of the cell X corresponds/is aligned to/with 4 slots of the cell Y (e.g., slot #p to slot #p+3) and the DL data can be received after k slots (e.g., 2 slots) on the basis of the first slot (i.e., slot #p) among the 4 slots of the cell Y corresponding to the slot #n of the cell X. Information on k can be indicated via DL grant DCI. In this case, the k may correspond to an integer equal to or greater than 0. The k is configured based on numerology used for transmitting DL data (e.g., PDSCH transmission). In this case, the DL data can be received via PDSCH and the DL grant DCI can be received via PDCCH. In this case, as described later, a cell can be replaced with a subband.

Meanwhile, when a single cell or a carrier is divided into a plurality of subbands and an SCS or a TU of a different size is set to each of a plurality of the subbands, although a UE operates on a plurality of the subbands at the same time or switches between subbands, the proposed methods of the present invention can be similarly applied. In this case, a cell can be replaced with a subband (within a cell) in the present invention. In this case, the subband is configured by contiguous frequency resources (e.g., a plurality of contiguous RBs) and can be referred to as a BWP (bandwidth part).

Figure 17:
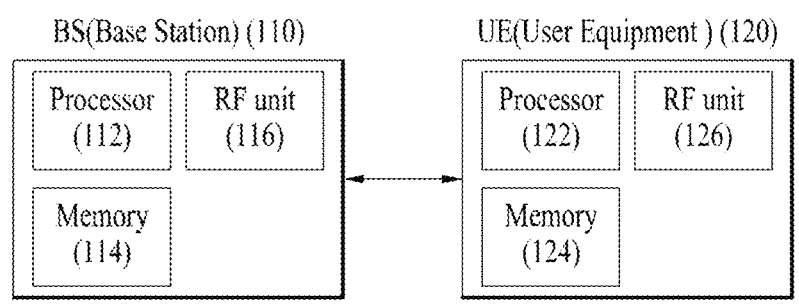
FIG. 17 illustrates a base station and a user equipment applicable to an embodiment of the present invention.

FIG. 17 illustrates a BS and a UE of a wireless communication system, which are applicable to embodiments of the present invention.

Referring to FIG. 17, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the B S. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to UEs, eNBs or other apparatuses of a wireless mobile communication system.

What is claimed is:

1. A method of performing communication by a user equipment (UE) in a wireless communication system, the method comprising:
   receiving, based on physical downlink control channels (PDCCH)-monitoring, each downlink control information (DCI) configured with a counter-downlink assignment index (C-DAI) for downlink (DL) scheduling;
   performing, in at least one serving cell, a reception of each DL signal based on the reception of each DCI; and
   transmitting an Acknowledgement/Negative acknowledgement (A/N) codebook including A/N information for the reception of each DL signal,
   wherein a value of the C-DAI denotes an accumulated number that is counted based on a plurality of indexes including a serving cell index for the reception of each DL signal, and
   wherein, for a case where (i) a first DL signal reception and a second DL signal reception are scheduled in a same serving cell, and (ii) first DCI for scheduling the first DL signal reception and second DCI for scheduling the second DL signal reception are monitored in a same time unit in the PDCCH-monitoring:
      the first DCI for scheduling the first DL signal reception is configured with an earlier order of C-DAI value than the second DCI for scheduling the second DL signal reception, based on that the first DL signal reception starts earlier than the second DL signal reception.

2. The method of claim 1, wherein the accumulated number for the C-DAI is counted up to a current time unit in the PDCCH-monitoring.

3. The method of claim 1, wherein the accumulated number for the C-DAI is counted in ascending order of each serving cell index.

4. The method of claim 1, wherein the accumulated number for the C-DAI is counted in ascending order of a time unit index in the PDCCH-monitoring.

5. The method of claim 1, wherein the accumulated number for the C-DAI is counted in ascending order of a time unit index in the PDCCH-monitoring, after counting the accumulated number for the C-DAI in ascending order of each serving cell index.

6. The method of claim 1,
   wherein each DCI is configured with a total-DAI in addition to the C-DAI, and
   wherein a value of the total-DAI denotes an accumulated total number that is counted based on each serving cell index for the reception of each DL signal, and a time unit index up to a current time unit in the PDCCH-monitoring.

7. The method of claim 1, wherein the A/N codebook is configured as a dynamic A/N codebook.

8. The method of claim 1, wherein the wireless communication system contains 3rd Generation Partnership Project (3GPP)-based wireless communication system.

9. A non-transitory medium storing instructions for a user equipment (UE) to perform the method of claim 1.

10. A method of performing communication by a base station (BS) in a wireless communication system, the method comprising:
    transmitting, to a user equipment (UE) through one or more physical downlink control channels (PDCCHs), each downlink control information (DCI) configured with a counter-downlink assignment index (C-DAI) for downlink (DL) scheduling;
    performing, in at least one serving cell, a transmission of each DL signal as scheduled based on the transmission of each DCI; and
    receiving, from the UE, an Acknowledgement/Negative acknowledgement (A/N) codebook including A/N information for the transmission of each DL signal, wherein a value of the C-DAI denotes an accumulated number that is counted based on a plurality of indexes including a serving cell index for the transmission of each DL signal, and wherein, for a case where (i) a first DL signal transmission and a second DL signal transmission are scheduled in a same serving cell, and (ii) first DCI for scheduling the first DL signal transmission and second DCI for scheduling the second DL signal transmission are transmitted in a same time unit for PDCCH-monitoring at the UE:

the first DCI for scheduling the first DL signal transmission is configured with an earlier order of C-DAI value than the second DCI for scheduling the second DL signal transmission, based on that the first DL signal transmission starts earlier than the second DL signal transmission.

11. The method of claim 10, wherein the accumulated number for the C-DAI is counted up to a current time unit for the PDCCH-monitoring at the UE.

12. The method of claim 10, wherein the accumulated number for the C-DAI is counted in ascending order of each serving cell index.

13. The method of claim 10, wherein the accumulated number for the C-DAI is counted in ascending order of a time unit index for the PDCCH-monitoring at the UE.

14. The method of claim 10, wherein the accumulated number for the C-DAI is counted in ascending order of a time unit index for the PDCCH-monitoring at the UE, after counting the accumulated number for the C-DAI in ascending order of each serving cell index.

15. The method of claim 10,
wherein each DCI is configured with a total-DAI in addition to the C-DAI, and
wherein a value of the total-DAI denotes an accumulated total number that is counted based on each serving cell index for the transmission of each DL signal, and a time unit index up to a current time unit for the PDCCH-monitoring at the UE.

16. The method of claim 10, wherein the A/N codebook is configured as a dynamic A/N codebook.

17. A device for wireless communication, the device comprising:
a memory configured to store instructions; and
a processor configured to perform operations by executing the instructions, the operations comprising:
receiving, based on physical downlink control channels (PDCCH)-monitoring, each downlink control information (DCI) configured with a counter-downlink assignment index (C-DAI) for downlink (DL) scheduling;
performing, in at least one serving cell, a reception of each DL signal based on the reception of each DCI; and
transmitting an Acknowledgement/Negative acknowledgement (A/N) codebook including A/N information for the reception of each DL signal, wherein a value of the C-DAI denotes an accumulated number that is counted based on a plurality of indexes including a serving cell index for the reception of each DL signal, and wherein, for a case where (i) a first DL signal reception and a second DL signal reception are scheduled in a same serving cell, and (ii) first DCI for scheduling the first DL signal reception and second DCI for scheduling the second DL signal reception are monitored in a same time unit in the PDCCH-monitoring:

the first DCI for scheduling the first DL signal reception is configured with an earlier order of C-DAI value than the second DCI for scheduling the second DL signal reception, based on that the first DL signal reception starts earlier than the second DL signal reception.

18. The device of claim 17, further comprising: a Radio Frequency module.

19. The device of claim 17, wherein the device is a user equipment (UE).

20. A base station (B S) for wireless communication, the B S comprising:
a transceiver; and
a processor configured to control the transceiver to:
transmit, to a user equipment (UE) through one or more physical downlink control channels (PDCCHs), each downlink control information (DCI) configured with a counter-downlink assignment index (C-DAI) for downlink (DL) scheduling;
perform, in at least one serving cell, a transmission of each DL signal as scheduled based on the transmission of each DCI; and
receive, from the UE, an Acknowledgement/Negative acknowledgement (A/N) codebook including A/N information for the transmission of each DL signal, wherein a value of the C-DAI denotes an accumulated number that is counted based on a plurality of indexes including a serving cell index for the transmission of each DL signal, and wherein, for a case where (i) a first DL signal transmission and a second DL signal transmission are scheduled in a same serving cell, and (ii) first DCI for scheduling the first DL signal transmission and second DCI for scheduling the second DL signal transmission are transmitted in a same time unit for PDCCH-monitoring at the UE:

the first DCI for scheduling the first DL signal transmission is configured with an earlier order of C-DAI value than the second DCI for scheduling the second DL signal transmission, based on that the first DL signal transmission starts earlier than the second DL signal transmission.

* * * * *